United States Patent
Kim et al.

(10) Patent No.: US 11,021,622 B2
(45) Date of Patent: *Jun. 1, 2021

(54) INK COMPOSITION FOR 3D PRINTING SUPPORTER AND 3D PRINTING PRODUCTION METHOD USING SAME

(71) Applicant: LG Chem, Ltd., Seoul (KR)

(72) Inventors: Mi-Kyoung Kim, Daejeon (KR); Joon-Hyung Kim, Daejeon (KR); Seung-A Back, Daejeon (KR); Sung-Eun Park, Daejeon (KR)

(73) Assignee: LG Chem, Ltd.

( * ) Notice: Subject to any disclaimer, the term of this patent is extended or adjusted under 35 U.S.C. 154(b) by 279 days.

This patent is subject to a terminal disclaimer.

(21) Appl. No.: 16/062,807

(22) PCT Filed: Feb. 17, 2017

(86) PCT No.: PCT/KR2017/001810
§ 371 (c)(1),
(2) Date: Jun. 15, 2018

(87) PCT Pub. No.: WO2017/146423
PCT Pub. Date: Aug. 31, 2017

(65) Prior Publication Data
US 2020/0131386 A1  Apr. 30, 2020

(30) Foreign Application Priority Data
Feb. 26, 2016  (KR) .......................... 10-2016-0023280

(51) Int. Cl.
*C09D 11/30* (2014.01)
*C08F 2/48* (2006.01)
*C08F 18/08* (2006.01)
*C08F 20/06* (2006.01)
*C08F 20/28* (2006.01)
*C08F 20/56* (2006.01)
*C08K 5/5397* (2006.01)
*C08L 31/04* (2006.01)
*C08L 33/06* (2006.01)
*C08L 33/26* (2006.01)
*C08L 39/06* (2006.01)
*B29C 64/40* (2017.01)
*B33Y 70/00* (2020.01)
*B33Y 80/00* (2015.01)

(52) U.S. Cl.
CPC ............. *C09D 11/30* (2013.01); *B29C 64/40* (2017.08); *C08F 2/48* (2013.01); *C08F 18/08* (2013.01); *C08F 20/06* (2013.01); *C08F 20/28* (2013.01); *C08F 20/56* (2013.01); *C08K 5/5397* (2013.01); *C08L 31/04* (2013.01); *C08L 33/064* (2013.01); *C08L 33/066* (2013.01); *C08L 33/26* (2013.01); *C08L 39/06* (2013.01); *B33Y 70/00* (2014.12); *B33Y 80/00* (2014.12); *C08L 2312/06* (2013.01)

(58) Field of Classification Search
CPC ...... C08L 31/04; C08L 33/064; C08L 33/066; C08L 33/26; C09D 11/30; C09D 11/00; C08F 20/06; C08K 5/5397; B29C 64/40
USPC .................................................. 523/160, 161
See application file for complete search history.

(56) References Cited

U.S. PATENT DOCUMENTS

| | | | |
|---|---|---|---|
| 6,863,859 B2 * | 3/2005 | Levy ...................... | B33Y 70/00 264/401 |
| 9,556,346 B2 | 1/2017 | Suzuki et al. | |
| 2004/0175451 A1 | 9/2004 | Maekawa et al. | |
| 2011/0221745 A1 | 9/2011 | Goldman et al. | |
| 2013/0234370 A1 | 9/2013 | Suzuki et al. | |
| 2018/0215937 A1 | 8/2018 | Kim et al. | |
| 2018/0281293 A1 | 10/2018 | Kim et al. | |

FOREIGN PATENT DOCUMENTS

| | | |
|---|---|---|
| AT | 412399 B | 2/2005 |
| CN | 107849381 A | 3/2018 |
| CN | 108025491 A | 5/2018 |
| EP | 2636511 A1 | 9/2013 |
| EP | 3372388 A1 | 9/2018 |
| JP | 2004291625 A | 10/2004 |
| JP | 2010155889 A | 7/2010 |
| JP | 2012111226 A | 6/2012 |
| JP | 2015078255 A | 4/2015 |
| JP | 2015123684 A | 7/2015 |
| KR | 20130079539 A | 7/2013 |
| KR | 20130141561 A | 12/2013 |
| KR | 20170010672 A | 2/2017 |

OTHER PUBLICATIONS

Search report from International Application No. PCT/KR2017/001810, dated May 31, 2017.
Liska, R., et al., "Water-Soluble Photopolymers for Rapid Prototyping of Cellular Materials." Journal of Applied Polymer Science, Accepted Jan. 4, 2005, vol. 97, pp. 2286-2298.
Extended European Search Report including Written Opinion for Application No. EP17756761.7 dated Dec. 13, 2018.
Search Report from Chinese Office Action for Application No. 2017800040852 dated Aug. 27, 2020; 2 pages.

* cited by examiner

*Primary Examiner* — Doris L Lee
(74) *Attorney, Agent, or Firm* — Lerner, David, Littenberg, Krumholz & Mentlik, LLP

(57) ABSTRACT

Disclosed is an ink composition for a 3D printing supporter and a 3D printing production method using the same, in which the ink composition is usable for an inkjet 3D printer, has excellent jetting properties and is easily dissolved in water after curing so that a supporter can be easily removed. The ink composition for a 3D printing supporter comprises: an amine-containing monomer, a curing agent, and a water-soluble polymer having an amine-containing polymer.

16 Claims, No Drawings

INK COMPOSITION FOR 3D PRINTING SUPPORTER AND 3D PRINTING PRODUCTION METHOD USING SAME

CROSS-REFERENCE TO RELATED APPLICATION(S)

The present application is a national phase entry under 35 U.S.C. § 371 of International Application No. PCT/KR2017/001810, filed on Feb. 17, 2017, which claims the benefit of priority to Korean Patent Application No. 10-2016-0023280, filed on Feb. 26, 2016, the entire contents of which is incorporated herein by reference.

TECHNICAL FIELD

The present invention relates to an ink composition for a 3D printing supporter and a method for producing 3D printing using the same. More specifically, the present invention relates to an ink composition for a 3D printing supporter and a 3D printing production method using the same, in which the ink composition is usable for an ink-jet 3D printer, has excellent jetting properties, and is easily dissolved in water after curing such that a supporter can be easily removed.

BACKGROUND ART

A 3D printer (three dimensional printer), which is a type of printer that prints a specific object in three dimensions, is a device that can produce real object in three-dimensional space like as printing three dimensional designs on paper. Like the principle of printing 2D images by ejecting inks onto the surface of the paper once a digitized file is transferred in an ink-jet printer, in addition to motions in the front and back (x-axis) and left and right (y-axis) in the 2D printer, a 3D printer additionally moves up and down (z-axis) to produce three-dimensional objects based on the inputted 3D drawings. When making a sculpture with such a 3D printer, a bridge structure or a structure floating in the air requires a support material. Such a support material also plays a role of supporting the structure well, but it must also be removed easily later.

DISCLOSURE

Technical Problem

As described above, when a 3D printer is used to produce a bridged or floating shape, a support material is required. For such a support material, an ink for a supporter that can be used in an ink-jet 3D printer is required. However, in the case of the conventional ink for a supporter, there has been a problem that a complicated removal process is required, such as taking off the supporter by hands or removing the supporter one by one using a water jet method. For example, Korean Patent Laid-Open Publication No. 2013-0141561 discloses a support material for supporting a shape during formation of photoshaped article by ink-jet photoshaping method. However, in this case, it takes a lot of time and effort to remove the supporter, and it is not easy to remove the supporter thoroughly. Further, there is a problem that the supporter is shrunk. Therefore, in order to solve these problems, there is a need for research on inks that can be photocured, while allowing to be removed by a simple method such as sonification or shaking after immersing in water after curing.

Accordingly, an object of the present invention is to provide an ink composition for a 3D printing supporter which can be used in an ink-jet 3D printer, has excellent jetting properties and is easily dissolved in water after curing to facilitate removal of the supporter, and a method for producing 3D printing using the same.

Technical Solution

In order to accomplish the above objects, the present invention provides an ink composition for a 3D printing supporter comprising: an amine-containing monomer; a curing agent; and a water-soluble polymer containing an amine-containing polymer.

Further, the present invention provides a method for producing 3D printing using the ink composition for a 3D printing supporter.

Effect of the Invention

According to the present invention, there are provided an ink composition that can be used in an ink-jet 3D printer, has excellent jetting properties and is easily dissolved in water after curing to facilitate removal of the supporter, and the method for producing 3D printing using the same.

DETAILED DESCRIPTION OF THE INVENTION

Hereinafter, the present invention will be described in detail.

The ink composition for a 3D printing supporter according to the present invention comprises an amine-containing monomer; a curing agent; and a water-soluble polymer containing an amine-containing polymer.

By containing the components as described above, the ink composition for a 3D printing supporter according to the present invention can be used in an ink-jet 3D printer, has excellent jetting properties and is easily dissolved in water after curing to facilitate removal of the supporter.

The amine-containing monomer is not particularly limited as long as it is used in the art. Preferred is a monomer having 1 to 30 carbon atoms and containing at least one amine group, more preferred is a monomer having 2 to 10 carbon atoms and containing at least one amine group. Examples thereof include N,N-dimethylacrylamide (DMA), diacetone acrylamide (DAA), N-[3-(dimethylamino)propyl]methacrylamide (DMAPMA), N-methyl-N-vinylacetamide (NMNVA), 2-(dimethylamino)ethylacrylate (DMAEA), N-vinylpyrrolidone (VP), 4-acryloylmorpholine (ACMO), N-methacryloylmorpholine, N-isopropyl acrylamide (NIPA), 2-methyl-2-oxazoline, 2-ethyl-2-oxazoline, N-isopropyl-2-oxazoline, ethylene imine, aziridine, and a mixture thereof.

The amine-containing monomer may be contained in an amount of 10 to 99.9% by weight based on the total weight of the ink composition for a 3D printing supporter according to the present invention. If the content of the amine-containing monomer is less than 10% by weight, dissolution characteristics in water may be insufficient during elimination of the supporter. If it exceeds 99.9% by weight, the curing property may be deteriorated.

The curing agent is contained in the ink composition for the 3D printing supporter according to the present invention and can be used in a curing process by various curing methods. Various curing agents can be used depending on the curing method. Conventional curing agents can be used without limitation. More specifically, a photoinitiator can be used as the curing agent, and there is no particular limitation as long as it is used in the art depending on the light source to be used. There may be used, preferably, Irgacure 819 (bis acyl phosphine-based), Darocur TPO (mono acyl phosphine-based), Irgacure 369 (α-aminoketone-based), Irgacure 184 (α-hydroxyketone-based), Irgacure 907 (α-aminoketone-based), Irgacure 2022 (bis acyl phosphine/α-hydroxyketone-based), Irgacure 2100 (phosphine oxide-based), Darocur ITX (isopropyl thioxanthone), or a product such as a photoinitiator having a structure similar thereto.

The curing agent may be contained in an amount of 0.01 to 20% by weight, preferably 1 to 10% by weight based on the total weight of the ink composition for a 3D printing supporter according to the present invention. If the content of the curing agent is less than 0.01% by weight, curing may not occur. If the content of the curing agent is more than 20% by weight, the curing sensitivity may excessively increase and the head may be clogged.

The water-soluble polymer containing an amine-containing polymer serves to control the viscosity of the ink and allows the cured product to be more easily dissolved in water. It may be any one or more of a polymer obtained by polymerizing amine-containing monomers and other water-soluble polymer, that is, a water-soluble polymer obtained by polymerizing amine-free monomers. A conventional polymer obtained by polymerizing amine-containing monomers and a conventional water-soluble polymer can be used without limitation. However, the polymer obtained by polymerizing amine-containing monomers and the water-soluble polymer obtained by polymerizing amine-free monomers may be not only a homo-polymer formed from a single type of monomer but also a co-polymer formed from two or more different monomers.

As the control of viscosity of the ink become easy, the viscosity of the ink can be raised to a necessary level (However, if the viscosity of the ink is high, the head must be heated for jetting). When the viscosity of the ink is increased, it is possible to prevent the ink from being excessively spread in the production of the 3D sculpture, so that it allows not only to manufacture a precise shape with high resolution, but also to improve the curing sensitivity of the ink. Especially, it is possible to prevent the ink from flowing down at the edge portion of the sculpture and spreading to an undesired portion. If the sculpture is manufactured with a higher resolution, the height of one layer becomes higher, so that it enables to increase the speed of manufacturing the 3D sculpture.

Among the water-soluble polymers, the polymer obtained by polymerizing amine-containing monomers is exemplified by polyvinylpyrrolidone (PVP), poly(N,N-dimethylacrylamide) (PDMA), poly(N-isopropylacrylamide) (PNIPA), poly(N-acryloylmorpholine) (PACMO), poly(N-methacryloylmorpholine), poly(2-methyl-2-oxazoline), poly(2-ethyl-2-oxazoline), poly(N-isopropyl-2-oxazoline), polyethyleneimine (PEI), poly(2-isopropenyl-2-oxazoline-co-methylmethacrylate), poly(vinylpyrrolidone-co-vinyl acetate), poly(N,N-dimethylacrylamide-co-2-hydroxyethyl methacrylate), etc.

Among the water-soluble polymers, a polymer other than the polymer obtained by polymerizing amine-containing monomers, that is, a water-soluble polymer obtained by polymerizing amine-free monomers is exemplified by polyacrylic acid (PAA), poly(2-hydroxyethyl acrylate), poly(2-hydroxyethyl methacrylate), etc.

The water-soluble polymer may be contained in an amount of 0.01 to 30% by weight based on the total weight of the ink composition for a 3D printing supporter according to the present invention. If the content of the water-soluble polymer is less than 0.01% by weight based on the total weight of the ink composition, the effect of increasing the solubility with the addition may become insignificant. If the content is more than 30% by weight, the viscosity of the ink become high so that jetting may become impossible.

The ink composition for a 3D printing supporter according to the present invention may further comprise a monomer (i.e., a V/A monomer) containing at least one of a vinyl group and an acrylate group. This makes it possible to control the curing sensitivity and the properties of the film such as strength (softness or hardness) of the cured product.

The monomer containing at least one of the vinyl group and the acrylate group is not particularly limited as long as it is used in the art. Preferably, there may be used, for example at least one selected from the group consisting of vinyl acetate, 2-hydroxyethyl (meth)acrylate, 2-hydroxymethyl (meth)acrylate, 2-hydroxypropyl (meth)acrylate, 4-hydroxybutyl (meth)acrylate, ethyl-2-hydroxy acrylate, 2-(acryloyloxy)ethyl hydrogen succinate, and methacrylic acid.

When the monomer containing at least one of the vinyl group and the acrylate group is used, the monomer containing at least one of the vinyl group and the acrylate group is preferably used in an amount of 0.01 to 80% by weight based on the total weight of the ink composition for a 3D printing supporter according to the present invention. If the content of the monomer containing at least one of the vinyl group and the acrylate group is less than 0.01% by weight based on the total weight of the ink composition, it is difficult to obtain sufficient effect with the addition of the monomer. If the content of the monomer is more than 80% by weight, there is a problem that the cured product is insoluble in water.

The ink composition for a 3D printing supporter according to the present invention may further contain an additive such as a surfactant, a plasticizer, a (thermal) polymerization inhibitor, a stabilizer, a defoaming agent, a diluent, and a viscosity controlling agent. The additive may be contained in the minimum amount that can exert its action, in the viewpoint of economics. Preferably they may be contained in an amount of 0.01 to 5% by weight based on the total amount of the ink composition.

Furthermore, the present invention provides a supporter which is produced by the above-described ink composition for a 3D printing supporter. The supporter is not particularly limited as long as it is used in the process of 3D printing.

Furthermore, the present invention provides a method for producing 3D printing, characterized by using the ink composition for a 3D printing supporter. The method is not particularly limited as long as it is related to the process of 3D printing.

Hereinafter, preferred embodiments of the present invention will be described in order to facilitate understanding of the present invention. It will be apparent to those skilled in the art that various modifications and variations can be made in the present invention without departing from the spirit or scope of the inventions. Such modifications and variations are intended to fall within the scope of the appended claims.

EXAMPLES

Preparation of Ink

An amine-containing monomer, a curing agent, a water-soluble polymer, a monomer (a V/A monomer) containing at least one of a vinyl group and an acrylate group and the like were mixed as shown in Table 1 below to prepare the inks of Examples 1 to 3. Further, inks of Comparative Examples 1 to 3 were prepared with the compositions shown in Table 1 below.

TABLE 1

|  | Amine-containing monomer | Curing agent | Water-soluble polymer | V/A monomer | Others |
|---|---|---|---|---|---|
| Example 1 | DMA + VP (40.75 wt % + 40.75 wt %) | I 819 (3.5 wt %) | PVP (15.0 wt %) | — | — |
| Example 2 | DMA + VP (35.75 wt % + 35.75 wt %) | I 819 (3.5 wt %) | PVP + Poly(2-ethyl-2-oxazoline) (5.0 + 10.0 wt %) | — | Ethanol (10.0 wt %) |
| Example 3 | DMA (58.33 wt %) | I 819 (3.5 wt %) | Poly(vinyl-pyrrolidone-co-vinylacetate) (9 wt %) | HEMA (29.17 wt %) | — |
| Comparative Example 1 | DMA + VP (48.25 wt % + 48.25 wt %) | I 819 (3.5 wt %) | — | — | — |
| Comparative Example 2 | DMA (76.5 wt %) | I 819 (3.5 wt %) | — | — | PD-6400 (20.0 wt %) |
| Comparative Example 3 | — | I 819 (3.5 wt %) | — | DPHA 5 wt %/TPGDA 81.5 wt % | PD-6400 (10.0 wt %) |

DMA: N,N-dimethylacrylamide
VP: N-vinylpyrrolidone
PVP: polyvinylpyrrolidone
HEMA: 2-hydroxyethyl methacrylate
DPHA: dipentaerythritol hexaacrylate
TPGDA: tripropylene glycol diacrylate
PD-6400: acrylic resins (manufactured by Almatex, USA)

EXPERIMENTAL EXAMPLES

Support structures were produced using the inks of Examples 1 to 3 and Comparative Examples 1 to 3. For the each of the produced support structures, the solubility in water and the curing degree (curing sensitivity) were evaluated. The results thereof are shown in Table 2 below, together with the viscosity of each ink.

Experimental Example 1. Evaluation of Solubility in Water

Each of the inks prepared in Examples 1 to 3 and Comparative Examples 1 to 3 was dropped onto a film substrate with a dropping pipet and then exposed using a high-pressure mercury lamp at amount of exposure of 1,000 mJ/cm$^2$. Subsequently, several layers were repeatedly formed to prepare a specimen of cured product of the ink. The specimen was taken out from the substrate and immersed in water. Then, the bottle in which the cured product of the ink was immersed was sonicated in a sonicator for 60 minutes. The solubility was evaluated by determining if the film of the cured supporter was dissolved in water. The results thereof are shown in Table 2 below. In Table 2, the symbol ○ indicates a case in which it was well dissolved in water, the symbol Δ indicates a case in which it was slightly dissolved (i.e., a case in which only a part of the substance was dissolved), and the symbol x indicates a case in which it was not dissolved in water.

Experimental Example 2. Evaluation of Curing Sensitivity

Each of the inks prepared in Examples 1 to 3 and Comparative Examples 1 to 3 was spin coated onto glass and then exposed using an LED lamp having a wavelength of 365 nm while controlling the amount of exposure to 125 mJ/cm$^2$, 250 mJ/cm$^2$, 500 mJ/cm$^2$ and 1,000 mJ/cm$^2$, respectively. The curing sensitivity was evaluated by visually observing whether it was cured. The amount of exposure when the ink starts to be completely cured was shown in Table 2.

Experimental Example 3. Evaluation of Formation of Pattern

Each of the inks prepared in Example 1 and Comparative Example 1 was ejected through an ink jet head (Dimatix 30 pL 128 nozzle head) with jetting voltage of 85V and jetting frequency of 1,000 Hz and then cured using an LED lamp having a wavelength of 395 nm (amount of exposure: 2,000 mJ/cm$^2$) to form pattern. The pattern was evaluated under the condition of resolutions of 1,200 dpi and 600 dpi, respectively. The results thereof are shown in Table 2 below. In Table 2, the symbol ○ indicates a case in which the pattern was normally formed, and the symbol x indicates a case in which the pattern was not normally formed.

TABLE 2

| | Viscosity (cP) | Solubility in water | Curing sensitivity (mJ/cm²) | Evaluation of pattern | |
|---|---|---|---|---|---|
| | | | | 1200 dpi | 600 dpi |
| Example 1 | 25.0 | ○ | 500 | ○ | ○ |
| Example 2 | 24.0 | ○ | 500 | — | — |
| Example 3 | 19.2 | ○ | 500 | — | — |
| Comparative Example 1 | 1.8 | ○ | 1000 | X | ○ |
| Comparative Example 2 | 22.0 | Δ | 500 | — | — |
| Comparative Example 3 | 45.5 | X | 500 | — | — |

As shown in Table 2, all of the inks prepared from the compositions of Examples 1 to 3 were found to have excellent viscosity, solubility in water and curing sensitivity. On the contrary, in the case of the ink prepared from the composition of Comparative Example 1, the solubility in water was excellent, but the curing sensitivity and the viscosity were significantly lower than those of the inks prepared in Examples 1 to 3. Further, in the case of the inks prepared from the compositions of Comparative Examples 2 and 3, the curing sensitivity and the viscosity were excellent, but it was found that the films of the cured supporters of the inks were dissolved only partially or not at all, indicating that the solubility in water is not good.

Moreover, in the formation of the pattern using the ink, for the Example 1, a rectangular pattern was well formed at the resolution of 1200 dpi (a height of one layer: 65 μm), but for the Comparative Example 1, the ink spread too much so that the pattern was collapsed at the resolution of 1200 dpi, making it impossible to form a rectangular pattern. When the resolution was reduced to 600 dpi, the pattern was formed. However, in this case, the number of droplets ejected per unit area decreased, so that the height of one layer was only 43 μm. That is, in the case of Example 1 in which the viscosity of the ink is high, the pattern can be formed well at high resolution, and the height of one layer is higher so that the 3D sculpture can be manufactured faster. On the other hand, in case of Comparative Example 1 in which the viscosity is low, the ink spreads too much and the ink spreads out of the pattern of the desired shape. If the ink spreads too much, it may be mixed with the ink of the neighboring structure. Therefore, it can be seen that it is not preferable to use the ink of Comparative Example 1 for the supporter.

The invention claimed is:

1. An ink composition for a 3D printing supporter comprising:
    an amine-containing monomer;
    a curing agent; and
    a water-soluble polymer containing at least two amine-containing polymers,
    wherein the at least two amine-containing polymers are selected from the group consisting of polyvinylpyrrolidone, poly(N,N-dimethylacrylamide), poly(N-isopropylacrylamide), poly(N-acryloylmorpholine), poly(N-methacryloylmorpholine), poly(2-methyl-2-oxazoline), poly(2-ethyl-2-oxazoline), poly(N-isopropyl-2-oxazoline), polyethyleneimine, poly(2-isopropenyl-2-oxazoline-co-methylmethacrylate), poly(vinylpyrrolidone-co-vinyl acetate), and poly(N,N-dimethylacrylamide-co-2-hydroxyethyl methacrylate).

2. The ink composition for a 3D printing supporter according to claim 1, characterized in that the content of the amine-containing monomer is 10 to 99.9% by weight based on the total weight of the ink composition for a 3D printing supporter.

3. The ink composition for a 3D printing supporter according to claim 1, characterized in that the content of the curing agent is 0.01 to 20% by weight based on the total weight of the ink composition for a 3D printing supporter.

4. The ink composition for a 3D printing supporter according to claim 1, characterized in that the content of the water-soluble polymer is 0.01 to 30% by weight based on the total weight of the ink composition for a 3D printing supporter.

5. The ink composition for a 3D printing supporter according to claim 1, characterized in that the amine-containing monomer is a monomer having 1 to 30 carbon atoms and containing at least one amine group.

6. The ink composition for a 3D printing supporter according to claim 1, characterized in that the amine-containing monomer is selected from the group consisting of N,N-dimethylacrylamide, diacetone acrylamide, N-[3-(dimethylamino)propyl]methacrylamide, N-methyl-N-vinylacetamide, 2-(dimethylamino)ethylacrylate, N-vinylpyrrolidone, 4-acryloylmorpholine, N-methacryloylmorpholine, N-isopropyl acrylamide, 2-methyl-2-oxazoline, 2-ethyl-2-oxazoline, N-isopropyl-2-oxazoline, ethylene imine, and a mixture thereof.

7. The ink composition for a 3D printing supporter according to claim 1, characterized in that the curing agent is a photoinitiator.

8. The ink composition for a 3D printing supporter according to claim 1, characterized in that the water-soluble polymer is of type selected from the group consisting of a homopolymer and a copolymer.

9. The ink composition for a 3D printing supporter according to claim 1, characterized in that the water-soluble polymer further comprises an amine-free polymer.

10. The ink composition for a 3D printing supporter according to claim 9, characterized in that the amine-free polymer is selected from the group consisting of polyacrylic acid, poly(2-hydroxyethyl acrylate), and poly(2-hydroxyethyl methacrylate).

11. The ink composition for a 3D printing supporter according to claim 1, characterized in that the ink composition for a 3D printing supporter further comprises a monomer containing at least one of a vinyl group and an acrylate group.

12. The ink composition for a 3D printing supporter according to claim 11, characterized in that the monomer containing at least one of the vinyl group and the acrylate group is at least one selected from the group consisting of vinyl acetate, 2-hydroxyethyl (meth)acrylate, 2-hydroxymethyl (meth)acrylate, 2-hydroxypropyl (meth)acrylate, 4-hydroxybutyl (meth)acrylate, ethyl-2-hydroxy acrylate, 2-(acryloyloxy)ethyl hydrogen succinate, and methacrylic acid.

13. The ink composition for a 3D printing supporter according to claim 11, characterized in that the content of the monomer containing at least one of the vinyl group and the acrylate group is 0.01 to 80% by weight based on the total weight of the ink composition for a 3D printing supporter.

14. The ink composition for a 3D printing supporter according to claim 1, characterized in that the ink composition further comprises an additive.

15. The ink composition for a 3D printing supporter according to claim 14, characterized in that the additive is at least one selected from the group consisting of a surfactant, a plasticizer, a (thermal) polymerization inhibitor, a stabilizer, a defoaming agent, a diluent, and a viscosity controlling agent.

16. A method for producing 3D printing, characterized by using the ink composition for a 3D printing supporter according to claim 1.

* * * * *